3,263,433
OXYGEN SUPPLY SYSTEMS
Peter W. Fitt, Yeovil, England, assignor to
Normalair Limited, Yeovil, England
Filed Dec. 4, 1959, Ser. No. 857,457
Claims priority, application Great Britain, Dec. 11, 1958,
39,941/58
11 Claims. (Cl. 62—52)

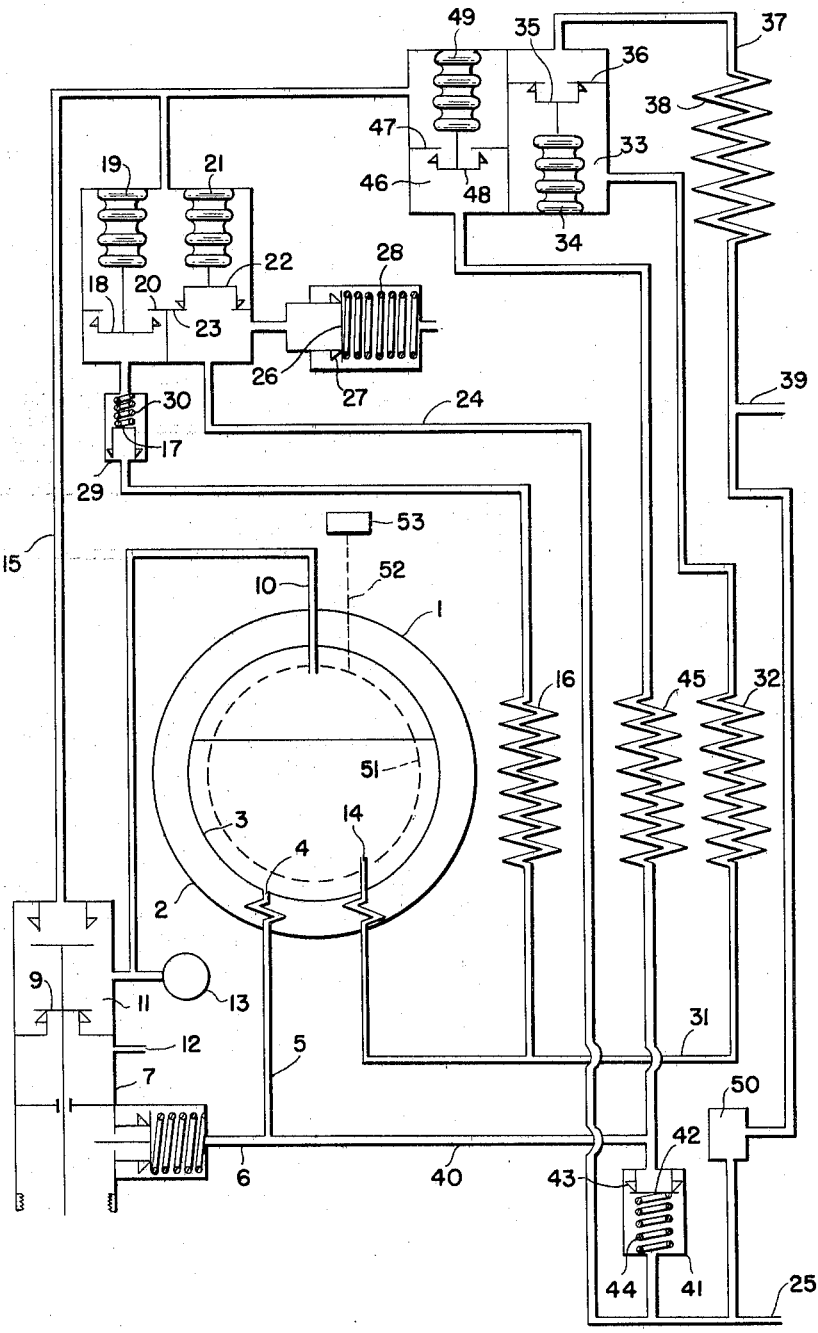

This invention relates to improved oxygen supply systems of the type utilising oxygen in the liquid state and is intended for use in particular, although not exclusively, in passenger carrying aircraft.

The invention also relates to gaseous supply systems using liquefied gases other than oxygen, including such gases as nitrogen, methane, ammonia and similar gases which can be converted to liquid at low temperatures.

The invention also relates to gases which can be liquefied and stored in insulated containers, more than one liquid being contained providing that such liquids are miscible. It has been proposed to provide oxygen supply systems in aircraft of the type using gaseous oxygen stored in cylinders and oxygen stored in the liquid state in apparatus generally referred to as liquid oxygen converters and it is with this latter apparatus that the present invention is primarily concerned.

In a system using gaseous oxygen stored in cylinders it is a comparatively simple matter to supply oxygen to selected points without the demand for oxygen at one point affecting the supply of oxygen at another point. However, when oxygen supply apparatus incorporating liquid oxygen converters is used, it is scarcely possible to supply more than one discharge conduit from a single converter, and at the same time to ensure that operation of the supply is retained for the sole use of certain discharge units. In some aircraft of the passenger carrying type it is necessary to provide a supply of gaseous oxygen for the passengers and of course a supply of gaseous oxygen for the crew of the aircraft. In order to ensure that a supply of oxygen is always available for the crew, it has been proposed that individual liquid oxygen converters be installed separately to supply the crew and the passengers with oxygen. The liquid oxygen converter is a well-known device used in oxygen supply systems and comprises basically an insulated container for storing liquid oxygen and provided with filling and discharge points and an evaporating coil externally of the container wherein liquid oxygen is caused to flow under pressure and eventually evaporates to the gaseous state.

Therefore, to supply individual liquid oxygen converters for both passengers and crew of an aircraft would also necessitate duplication of liquid oxygen filling and discharge points and all ancillary equipment normally associated with such devices resulting in additional weight and storage space being utilised and increasing the servicing and maintenance duties of the aircraft.

The object of this invention is to provide an oxygen supply system incorporating a liquid oxygen converter whereby gaseous oxygen can be supplied to differing discharge points from the single oxygen supply source.

The objects of the invention will become apparent from the following description and accompanying schematic drawing. FIGURE 1 shows in schematic form an oxygen converter with control means and incorporating the invention.

According to one convenient form by way of example only, the invention is described relating to means for supplying gaseous oxygen but it is to be understood that any other suitable gas or gases may be used.

In the drawing the liquid oxygen converter is shown in general at 1 and has an outer shell 2 separated from an inner shell 3 by a space in which is maintained a very high degree of vacuum. The shells 2 and 3 are made of stainless steel and are welded across their horizontal axes, the normal means for separation of the two shells is adopted, but not described. A liquid oxygen outlet is shown at 4 this being substantially at the lowest point of the converter when it is in a normal attitude. Conduits 5 and 6 communicate with a normal type filler build-up and vent valve shown in general at 7. When liquid oxygen is supplied to the filler, built-up and vent valve at a pressure of say 20 p.s.i. the liquid oxygen flows through the non return valve 8, conduit 6 and conduit 5 to the inside of the converter. The action of applying the liquid hose to the lowest part of 7 moves a stem which unseats the valve 9. The opening of valve 9 permits communication between the top of the converter by means of conduit 10 so that gas and any excess liquid oxygen can be discharged through compartment 11 of valve 7 and out through the vent 12. Pressure gauge 13 indicates gaseous pressure in the converter. In addition to the low liquid take-off point 4 in the converter, there is also a liquid take-off point 14 which in some predetermined distance above point 4 and thereby allows a chosen reserve of liquid oxygen to be retained below take-off point 14 for use by the crew from take-off point 4 in the event of a continued emergency. When the filler build-up vent valve is in the normal operating position as shown there is communication from chamber 11 with take-off point 14 by means of conduit 15, valve 18 and build-up coil 16. When the liquid oxygen flows out through take-off point 14 pressure can be built up to, say, 300 p.s.i., by the passage of the liquid through a build-up coil 16 and through non return valve 17. While the pressure is being built up the pressure closing valve 18 associated with pressure closing bellows 19 permits flow past seating 20 so that gaseous oxygen can pass in a normal way through conduit 15 and into the top of the converter by conduit 10. When sufficient pressure has been developed in the converter 1 due to the absorption of heat by coil 16 pressure closing valve 18 seats, thus stopping further pressure rendering further build-up by means of coil 16. Should a gaseous pressure in the converter still rise, to say, 320/330 p.s.i., a further bellows 21 housed in the same compartment as bellows 19 causes valve 22 to be lifted from seating 23 and admit gas to conduit 24 and so to the delivery conduit 25. This delivery conduit is conveniently termed the secondary delivery conduit for reasons to be apparent later. Should the gaseous pressure in the converter increase above, say, 340 p.s.i., the pressure is relieved by valve 26 lifting from seating 27 against the force of spring 28, thus venting the oxygen. Valves 18, 22 and 26 would form part of a typical liquid oxygen converter system, but non return valve 17 is desirable to suit the present invention. When inoperative valve 17 bears against seating 29 by reason of the action of spring 30. When the pressure in the converter has been raised to say, 310 p.s.i., liquid oxygen flows through take-off point 14 by means of conduit 31 to evaporator coil 32 into the valve compartment 33 which houses bellows 34 operating valve 35 so that at pressure above, say, 160 p.s.i., valve 35 is pulled away from seating 36 thus permitting the passage of gaseous oxygen through conduit 37, super heating coil 38 into conduit 39. This conduit, which for convenience may be described as the first delivery conduit, supplies gaseous oxygen during emergencies to the passengers of the aircraft and also supplies oxygen when there is not a general emergency but when there is a therapeutic use for certain passengers. During normal conditions and also when an emergency exists, gaseous oxygen must be available in sufficient quantities to the pilot and essential crew members, but the liquid oxygen converted for this purpose does not pass out of take-off point 14 but rather from take-off point 4 it flows through conduit 40 through differential check valve 41 into the second delivery conduit 25. Valve 41 has a valve plate 42 held against seating 43 by spring 44 and gives a differential pressure of approximately 5 p.s.i. Oxygen for the crew members is normally obtained from outlet 4 by conversion of the liquid into gas but, when the pressure in the converter is above say, 330 p.s.i., gaseous oxygen is delivered (without any wastage through the relief valve) by means of upper outlet 10, conduit 15, valve 22, conduit 24. This oxygen does not have to pass through the differential valve 41 and thus gaseous oxygen only flows when the pressure is above say, 330 p.s.i. With the system described, under normal conditions gaseous oxygen is not supplied to the passengers via the first delivery conduit 39 unless it is required for therapeutic use. When, due to an emergency a large and continuous demand of oxygen has been made and the level of the liquid oxygen in the converter has fallen to the level of take-off point 14, a new condition arises and for a short while gaseous oxygen is delivered from the take-off point 14 but the pressure soon falls with demand since no liquid oxygen is vapourised in this portion of the circuit. When the converter pressure has fallen to, say, 160 p.s.i., pressure opening valve 35 closes against its seating, thus cutting off supplies to the passengers, this is an extreme measure but is with a view to their ultimate interest since the pilot and essential members of the crew still have an oxygen supply by reason of the reserve liquid existing between the level of outlets 14 and 4. The maintenance of pressure at, say, 100 p.s.i., in the converter is assisted by the passage of vapourised oxygen from conduit 40 through build-up coil 45. This coil communicates with compartment 46 having seating 47 co-operating with valve head 48, said valve head being urged by bellows 49 to close when the pressure surrounding bellows 49 equals 100 p.s.i. Pressure to bellows 49 is obtained via conduit 15 and converter upper outlet 10. When the pressure in the converter is more than 100 p.s.i., build-up coil 45 is inoperative. Although the invention provides for the reserving of the chosen amount of liquid oxygen for exclusive use of the essential crew members there is, however, provision for supplying gaseous oxygen from the second delivery conduit 25, to the first delivery conduit 39 for the passengers, a manually controlled transfer valve 50 under control of the crew making this possible when such is essential. The liquid contents of the converter are indicated by normal means indicated as a capacitance 51 inside the converter electrical connections 52 and indication means 53.

The non-return valve 17 is to stop reverse flow through coil 16 if the converter is open to atmospheric pressure by the vent 12.

Although the invention has been described as being applied to liquid oxygen systems, it is to be understood that the invention can also be applied to systems using liquefied gas capable of stowage in an insulated container.

I claim as my invention:

1. A liquid gas converter system including an insulated container having liquid and gas phase sections, a pressure build-up circuit comprising a build-up conduit interconnecting said gas and said liquid phases and containing in series a heat exchanger and a pressure closing valve having a seat and co-operating closure member, said build-up conduit having its liquid take-off point positioned in such a manner that a predetermined liquid gas reserve remains below said liquid take-off point upon the liquid level in said converter rendering said build-up circuit inoperative, whereby said liquid gas reserve is used at a lower pressure than the pressure previously maintained by said build-up circuit, passage means for conveying oxygen from said container to at least two points of use, and means for automatically closing the passage means to one of said points of use when said build-up circuit is rendered inoperative due to the liquid level falling below said take-off point.

2. A liquid gas converter system including an insulated container having liquid and gas phase sections, a pressure build-up circuit comprising a build-up conduit interconnecting said gas and said liquid phases and containing in series a heat exchanger and a pressure closing valve having a seat and co-operating closure member, said build-up circuit having its liquid take-off point positioned in such a manner that a predetermined liquid gas reserve remains below said liquid take-off point upon the liquid level in said converter rendering said pressure build-up circuit inoperative, pressure controlling means utilizing the reserve liquid to control pressure in said converter at a lower pressure than the pressure existing in the converter before the reserve condition is reached, and means for delivering oxygen from said container to a plurality of points when said build-up circuit is operative and to a lesser number of points when said build-up circuit is rendered inoperative.

3. A liquid gas converter system including an insulated container having liquid and gas phase sections, a first pressure build-up circuit comprising a build-up conduit interconnecting said gas and said liquid phases and containing in series a heat exchanger adjacent the liquid phase and a pressure closing valve having a seat and co-operating closure member, said system also including a pressure controlling device defined by a second pressure build-up circuit comprising a build-up conduit interconnecting said gas and said liquid phases and containing in series a heat exchanger adjacent the liquid phase and a pressure closing valve having a seat and co-operating closure member, said first pressure build-up circuit being adapted to maintain a first predetermined pressure range and having its liquid take-off point positioned in such a manner that a predetermined liquid gas reserve remains below said liquid take-off point when the liquid level in said converter renders said first build-up circuit inoperative, said second pressure build-up circuit being adapted to maintain continuously a lower predetermined pressure range, whereby said system delivers gas at said first predetermined pressure range until said predetermined reserve remains in said converter and then said system delivers gas at a pressure within said lower predetermined range.

4. A liquid gas converter system as defined in claim 3 having a first and second delivery conduit, said first delivery conduit having therein a valve adapted to open at and above a pressure intermediate said first pressure range and said lower pressure range, such that said system is adapted to deliver gas to said first and second delivery conduits at a pressure within said first range until the liquid reserve is reached, said system then adapted to deliver gas to said second delivery conduit only, at a pressure within the lower range.

5. A liquid gas converter system including an insulated container having liquid and gas phase sections, a first pressure build-up circuit comprising a build-up conduit interconnecting said gas and said liquid phases and containing in series a heat exchanger adjacent the liquid phase and a pressure closing valve having a seat and co-operating closure member, said system also including a second pressure build-up circuit comprising a build-up conduit interconnecting said gas and said liquid phases and containing in series a heat exchanger adjacent the liquid phase and a pressure closing valve having a seat and co-operating closure member, said first pressure build-up circuit being adapted to maintain a first predetermined pressure range and having its liquid take-off point positioned in such a manner that a predetermined liquid gas reserve remains below said liquid take-off point when the liquid level in said converter renders said first build-up circuit inoperative, said second pressure build-up circuit being adapted to maintain a lower predetermined pressure range, said system having a first delivery conduit communicating with the liquid phase of said first build-up circuit and having therein a heat exchanger and a pressure opening valve adapted to open at and above a pressure intermediate said first and lower pressure ranges, said system having a second delivery conduit communicating with the liquid phase of said second pressure build-up circuit.

6. A liquid gas converter system including an insulated container having liquid and gas phase sections, a first pressure build-up circuit comprising a build-up conduit interconnecting said gas and said liquid phases and containing in series a heat exchanger adjacent the liquid phase and a pressure closing valve having a seat and co-operating closure member, said system also including a second pressure build-up circuit comprising a build-up conduit interconnecting said gas and said liquid phases and containing in series a heat exchanger adjacent the liquid phase and a pressure closing valve having a seat and co-operating closure member, said first pressure build-up circuit being adapted to maintain a first predetermined pressure range and having its liquid take-off point positioned in such a manner that a predetermined liquid gas reserve remains below said liquid take-off point when the liquid level in said converter renders said first build-up circuit inoperative, said second pressure build-up circuit being set to maintain a lower predetermined pressure range, said system having a first delivery conduit communicating with the liquid phase of said first build-up circuit and having therein a heat exchanger and a pressure opening valve adapted to open at and above a pressure intermediate said first and lower ranges, said system having a second delivery conduit communicating with the liquid phase of said second pressure build-up circuit and having therein a differential check valve, and also in said system a pipe communicating between said gas phase and said second delivery conduit downstream of said check valve, said pipe having a pressure opening valve therein adapted to open at a pressure above said first pressure range.

7. A liquid gas converter system as claimed in claim 6 including a vent and in which a non-return valve is provided in said first pressure build-up circuit to prevent reverse flow and undesirable heat transfer into said converter when said converter is open to atmospheric pressure by way of said vent.

8. A liquid gas converter system as claimed in claim 7 wherein a conduit containing a valve is provided between said first delivery conduit and said second delivery conduit such that upon opening of said valve, gas may be supplied from said second conduit to said first conduit during lower pressure range of operation of said system.

9. In a liquid oxygen supply system having a liquid oxygen container and pressure build-up circuit for generation of vapor pressure within said container to promote flow of liquid oxygen from the container for consumption, the combination of a first consumer supply line extending from a first outlet of said container which is at the base thereof when the container is in its normal upright position, a second consumer supply line extending from a second outlet of the container which is located at a higher level than the first outlet, and a shut-off valve in said second consumer supply line which functions to close automatically for rendering the second consumer supply line inoperative when the level of liquid oxygen in said container falls below the level of the second outlet.

10. In a liquid oxygen supply system having a liquid oxygen container and a pressure build-up circuit for generation of vapor pressure within said container to promote feed of liquid oxygen from the container for consumption, the combination of a first consumer supply line extending from a first outlet of said container which is at the base thereof when the container is in its normal upright position, a second consumer supply line extending from a second outlet of the container which is located at a higher level than the first outlet, a shut-off valve in said second consumer supply line, and pressure-responsive means operative to actuate said shut-off valve in response to pressure in said second consumer supply line and in the sense to close the valve for rendering the second consumer supply line inoperative when said pressure drops due to the level of liquid oxygen in the container falling below the level of the second outlet.

11. A liquid gas converter system including an insulated container, a first pressure build-up circuit having a liquid take-off point connected to the container and comprising a build-up conduit containing in series a heat exchanger and a pressure closing valve, said system also including a second pressure build-up circuit having a liquid take-off point connected to the container and comprising a build-up conduit containing in series a heat exchanger and a pressure closing valve, said first pressure build-up circuit being adapted to maintain a first predetermined pressure range and having its liquid take-off point positioned in such a manner that a predetermined liquid gas reserve remains below said liquid take-off point when the liquid level in said converter renders said first build-up circuit inoperative, said second pressure build-up circuit being adapted to maintain a lower predetermined pressure range, said system having a first delivery conduit communicating with a liquid phase of said first build-up circuit and having therein a heat exchanger and a pressure opening valve adapted to open at and above a pressure intermediate said first and lower pressure ranges, said system having a second delivery conduit communicating with the liquid phase of said second pressure build-up circuit.

References Cited by the Examiner

UNITED STATES PATENTS

| 1,943,059 | 1/1934 | Dana | 62—51 |
| 1,953,533 | 4/1934 | Edwards | 62—51 |
| 2,195,387 | 3/1940 | Schlumbohm | 62—51 |
| 2,464,835 | 3/1949 | Thayer | 62—51 |
| 2,479,070 | 8/1949 | Hansen | 62—51 |
| 2,489,514 | 11/1949 | Benz | 62—52 |
| 2,938,576 | 5/1960 | Cox et al. | 62—52 |
| 2,943,454 | 7/1960 | Lewis | 62—52 |
| 2,958,204 | 11/1960 | Spaulding | 62—52 |
| 2,968,163 | 1/1961 | Beckman | 62—52 |

FOREIGN PATENTS 114,176   10/1900   Germany.

ROBERT A. O'LEARY, *Primary Examiner.*

EDWARD J. MICHAEL, MEYER PERLIN, *Examiners.*

R. C. STEINMETZ, M. L. MOORE, L. L. KING,
*Assistant Examiners.*